Aug. 22, 1950   D. FULTON   2,519,451
AMMONIA DISTILLATION
Filed June 8, 1946
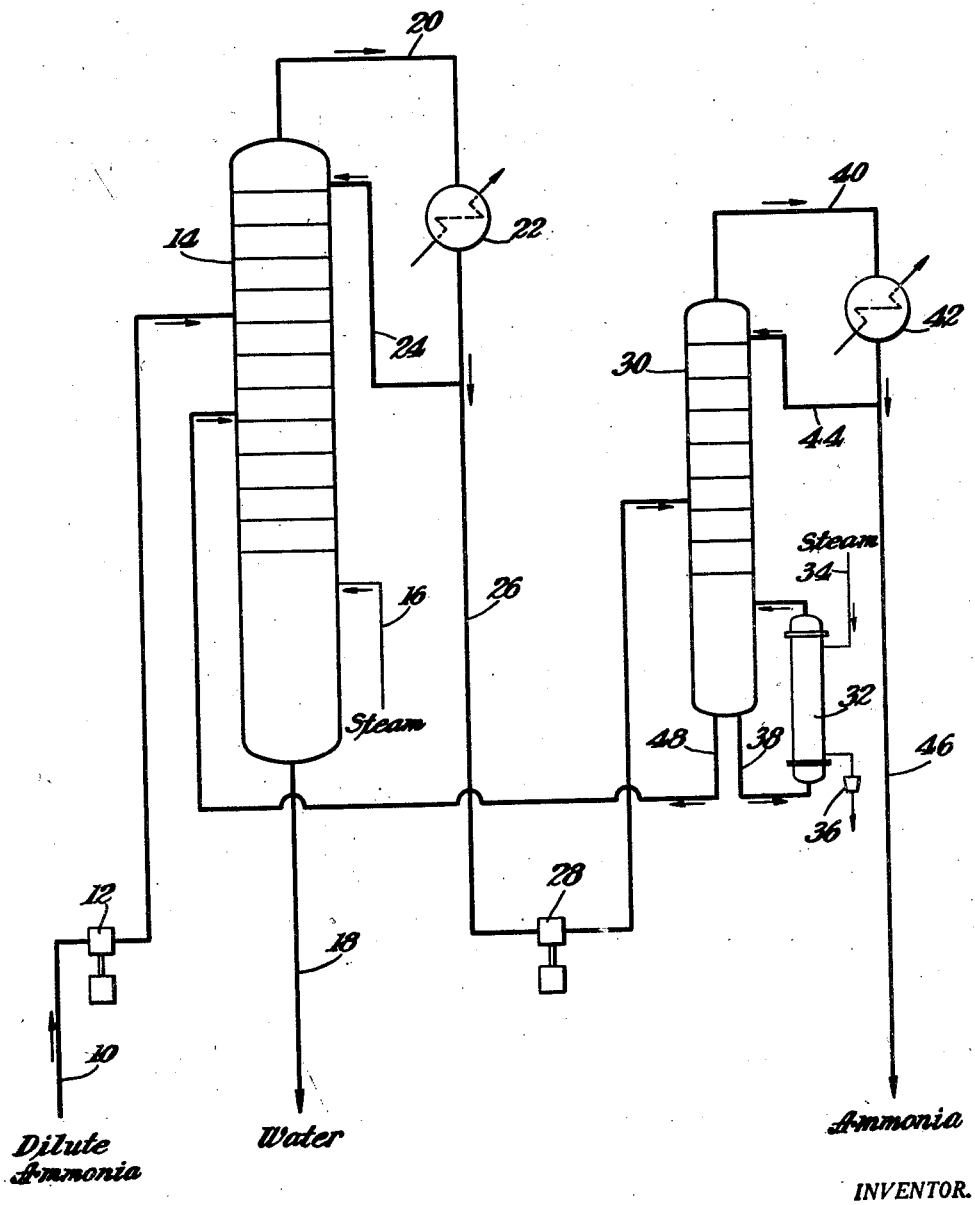
Dilute Ammonia
Water
Ammonia
INVENTOR.
David Fulton
BY Nathaniel Ely
ATTORNEY Patented Aug. 22, 1950

2,519,451

UNITED STATES PATENT OFFICE 2,519,451

AMMONIA DISTILLATION

David Fulton, Elmhurst, N. Y., assignor to The Lummus Company, New York, N. Y., a corporation of Delaware Application June 8, 1946, Serial No. 675,374

3 Claims. (Cl. 202—46)

This invention relates to an improvement in the concentration of aqueous ammonia solutions, particularly for the production of anhydrous ammonia.

In the refrigerant and other fields, it has been customary to use ammonia which becomes relatively dilute after the refrigeration cycle or other use and it is necessary to concentrate the ammonia for reuse in the system. While there have been several suggestions for recovering this anhydrous ammonia, most of the processes require relatively high pressure steam as well as low temperature cooling water. It is necessary to maintain a temperature difference in the rectifying column which is sufficiently great to assure relatively pure end products in the respective overhead and bottoms draw-off.

Where such ammonia recovery is desired, however, it frequently appears that cooling water is insufficiently low in temperature to maintain optimum operating conditions at the top of the column and very often the required high pressure steam is not available or is too expensive to use. As a result, either an impure ammonia stream is produced at the top of the column or a substantial amount of ammonia is lost with the water at the bottom.

In accordance with my invention, I recover anhydrous ammonia from a dilute aqueous solution by the use of a two-step process operated in such a manner as to permit the complete discharge of water as bottoms product from the first column and a discharge of anhydrous ammonia as the overhead of the second column. By interconnecting the columns, in accordance with my invention, I am able to use comparatively low pressure steam and I can operate with relatively high temperature cooling water.

It is the principal object of my invention to completely recover anhydrous ammonia from a dilute water solution in accordance with the foregoing operation.

Further objects and advantages of my invention will appear from the following description of a preferred form of embodiment thereof taken in connection with the attached drawing which is a diagrammatic flow sheet schematically showing the arrangement of columns and other major process equipment.

A typical aqueous ammonia charge 10 may consist of 100 parts of ammonia in 900 parts of water, or a 10% solution, and such feed is pumped through pump 12 to primary column 14 which is preferably operated under a superatmospheric pressure of approximately 140 pounds per square inch gauge. This pressure is for a case where the available steam pressure is 150 pounds per square inch gauge, so that the stripping steam may be introduced into the tower.

This column is of the usual bubble type and is provided with steam stripping at 16, which effectively maintains the lower part of the column 14 at a temperature of approximately 360° F.

As a result, it is possible to completely drive off all ammonia overhead and the bottoms product removed at 18 will consist of the entire 900 parts of water with only a trace of ammonia. Depending upon the efficiency of fractionation, this can be expressed in a few parts per million.

The overhead 20 includes all of the ammonia vapor plus a small proportion of water vapor and this is condensed in the overhead condenser 22 to a temperature of approximately 100° F. This can be effectively accomplished with cooling water as high as 90° F.

The column 14 is refluxed by a portion of the condensate through line 24 and the balance which is a concentrated ammonia water mixture is removed through line 26, which is a transfer line to the second column hereinafter described.

This concentrated ammonia-water mixture from column 14 is then increased in pressure by pump 28 and introduced to the second column 30. This tower is preferably operated at a pressure of approximately 200 pounds per square inch gauge or higher.

In the second column 30, which is also of bubble tray type, the heat required for effective separation is supplied by a bottoms reboiler 32 which may be supplied by steam through line 34 under control of trap 36. A proportion of the bottoms product is removed at 38, heated in the reboiler 32 and returned to the column in the usual manner.

As previously mentioned, the temperature and pressure in column 30 is maintained at such a degree that a pure ammonia is removed overhead at 40, such ammonia being cooled to approximately 100° F. in overhead condenser 42, with a portion of the liquid ammonia returned as reflux through line 44. The product comprising the initial 100 parts of ammonia is removed through line 46.

The net bottoms from column 30 removed through line 48 will contain a small amount of ammonia (aproximately 2.17 parts) in approximately 34 parts of water. This is returned to column 14 and is continuously recycled through the system. This ammonia is removed overhead in line 20 with substantially the same amount of water.

The advantages of my invention will appear from the foregoing in which it will be apparent that I can remove substantially all of the ammonia in the original solution and such ammonia will be free of water. Furthermore, I can operate the first column at a lower pressure than customary and with better results, for in the past it has been usual to operate the first column at 200 pounds per square inch aguge when the cooling water is available at 90° F. and under such pressure using 150 pounds per square inch gauge steam the minimum concentration to which the bottom can be stripped is about 5% NH₃. Since the feed is 10% NH₃ half of the ammonia is lost. This scheme also requires the addition of a shell-and-tube heat exchanger as the reboiler for such column.

I have heretofore set forth the conditions of operation when 90° F. cooling water is available, but it is to be understood that my invention is also of advantage when cooling water is available at other temperatures. In the following table I have set forth the tower pressure range and the steam pressure range for the first tower and the tower pressure in the second tower for different conditions. The pressures are given in pounds per square inch gauge.

| Cooling Water | First Tower | | Second Tower, Tower Pressure |
|---|---|---|---|
| | Tower Pressure | Steam Pressure | |
| °F. | | | |
| 60 | Atmos.-115 | 10-125 | 115 |
| 70 | 10-140 | 20-150 | 140 |
| 80 | 15-165 | 25-175 | 165 |
| 90 | 20-200 | 30-210 | 200 |
| 100 | 30-235 | 40-245 | 235 |

It is apparent from an inspection of the above table that the minimum pressure in the first tower increases substantially linearly from atmospheric pressure to 30 p. s. i. g. and that the pressure in the second tower also increases substantially linearly from 115 p. s. i. g. to 235 p. s. i. g. both in accordance with an independent linear increase in the temperature of the available cooling water from 60° F. to 100° F.

It will be understood that if under conditions of 100° F. cooling water a steam pressure of 245 pounds per square inch gauge is necessary to operate in a single tower. If the steam is at less than 245 pounds per square inch gauge, anhydrous ammonia can not be produced overhead thus the consequent loss of charge. As shown, the steam pressure available ought to be between 40 and 245 pounds per square inch gauge. If steam pressure of 40 pounds per square inch gauge or above is not available, the recycle rate becomes excessive and it may be uneconomical to operate. I do not suggest, however, that it is necessary to have steam pressure as high as 245 pounds per square inch gauge, for in the range of 40 pounds per square inch gauge to 245 pounds per square inch gauge, an effective concentration is accomplished in the first tower but the recycle rate becomes increasingly reduced as the steam pressure increases. One hundred fifty pounds per square inch gauge steam pressure with 100° F. cooling water gives a recycle ratio of approximately 6% of the feed.

As above described with 90° F. cooling water, and operating the first column at 140 pounds per square inch gauge, there is only approximately 2% recycle in the original charge.

As a result, the second column 30 is considerably smaller than the first column 14 for the charge to the second column consists of only 102 parts of ammonia and 34 parts of water as compared to the 1000 parts of water and ammonia charged to the first column 14.

The economical range of operation of my process is thus somewhere between a minimum available steam pressure, such that the recycle rate is not excessive, and the necessary high steam pressure for single tower operation based on the available cooling water temperature and the permissible loss of ammonia.

While I have shown and described a preferred form of embodiment of my invention, I am aware that modifications may be made thereto and I desire, therefore, a broad interpretation of my invention within the scope and spirit of the description herein and of the claims appended hereinafter.

I claim:

1. The method of concentrating a weak aqueous solution of ammonia to produce anhydrous ammonia by fractionation, wherein there is available steam at a pressure below 245 p. s. i. g. and cooling water at a temperature of from 60° F. to 100° F. which comprises steam stripping and rectifying said solution in a first column at a pressure exceeding atmospheric but less than the pressure of said available steam thereby producing an ammonia-free bottoms and an aqueous ammonia overhead in said column, totally condensing said overhead with cooling water at said temperature, recycling a portion of said condensate as a reflux to said first column, increasing the pressure on a second portion of said condensate, distilling said second portion of said condensate under said increased pressure in a second column thereby producing an anhydrous ammonia overhead and a dilute ammonia bottoms, condensing said overhead with cooling water at said temperature and recycling the bottoms from said second column to an intermediate point of said first column, the minimum pressure in said first column increasing substantially linearly from atmospheric pressure to 30 p. s. i. g. and the pressure in said second column increasing substantially linearly from 115 p. s. i. g. to 235 p. s. i. g. both in accordance with an independent linear variation in the temperature of said available cooling water from 60° to 100° F.

2. The method of concentrating a weak aqueous solution of ammonia to produce anhydrous ammonia by fractionation, wherein low pressure steam of approximately 150 pounds per square inch gauge and high temperature cooling water of approximately 90° F. are utilized which comprises distilling the solution in a first column under a pressure of approximately 140 pounds per square inch gauge to produce an ammonia free bottoms in said column, totally condensing the overhead with said cooling water, increasing the pressure on said condensate to approximately 200 pounds per square inch gauge, fractionally distilling said condensate in a second column to produce anhydrous ammonia overhead and a dilute ammonia bottoms, condensing said overhead with said cooling water, and recycling said bottoms to said first column at an intermediate point and below the feed.

3. The method of concentrating a weak aqueous solution of ammonia as claimed in claim 2 in which the recycle ratio of the second column bottoms to the feed of the first column is maintained less than six per cent of the feed to the first column.

DAVID FULTON.

REFERENCES CITED

The following references are of record in the file of this patent:

UNITED STATES PATENTS

| Number | Name | Date |
| --- | --- | --- |
| 505,427 | Vail et al. | Sept. 19, 1893 |
| 583,262 | Krebs | May 25, 1897 |
| 1,873,829 | Schoeld | Aug. 23, 1932 |
| 2,012,621 | Bennett | Aug. 27, 1935 |
| 2,108,914 | Bennett | Feb. 22, 1938 |

FOREIGN PATENTS

| Number | Country | Date |
| --- | --- | --- |
| 132,504 | Great Britain | Sept. 1, 1919 |